United States Patent Office  
3,340,067  
Patented Sept. 5, 1967

3,340,067
FLOUR MIX COMPOSITION AND BATTER
PREPARED THEREFROM
John H. Wallis, Evansville, Ind., assignor to General
Foods Corporation, White Plains, N.Y., a corporation
of Delaware
No Drawing. Filed May 18, 1964, Ser. No. 368,342
6 Claims. (Cl. 99—94)

ABSTRACT OF THE DISCLOSURE

A flour mix composition is prepared containing corn flour, rice flour and dried egg yolk which have been purified by treatment with a non-toxic alkylene oxide, such as propylene oxide, prior to blending with additional ingredients. A batter suitable for use in making pancakes and griddlecakes is prepared by mixing the aforementioned flour mix with milk and/or water. The batter thus prepared has a refrigerated storage life of about 20 to 30 days.

---

The present invention relates to flour mix compositions having good stability under ordinary storage conditions and to batters adapted for refrigerated storage prepared from said flour mix compositions and suitable for making waffles, pancakes and the like.

It has long been recognized that flour compositions which require a minimum amount of ingredients to be added thereto to produce a batter offer maximum convenience to a baker or householder. In recent years, numberous so-called dry, ready mix flour mix compositions have become available and these usually require certain other ingredients to be added by the baker or householder such as, for example, water, milk, and/or eggs in the preparation of a batter for cakes, biscuits, waffles, pancakes and the like. Where batters are prepared on a commercial basis from such compositions, problems do not ordinarily arise since such batters are intended to be baked into finished products almost immediately after preparation. However, from the point of view of the ultimate consumer, i.e., the householder, many packaged mixes leave much to be desired. The householder, for example, may frequently have to add several ingredients to the packaged mix in order to produce a batter, which, of course, requires a considerable period of time and may possibly also cause variation in the quality of the baked goods. If the packaged mix is one for making waffles, pancakes and the like, any excess batter cannot ordinarily be stored even under refrigeration, without significant deterioration and must therefore be discarded. A packaged waffle and pancake mix product which would allow the consumer to prepare waffles and pancakes without having to add additional ingredients would afford considerable advantage in today's convenience oriented food market. Thus, a prepared waffle and pancake batter product which could be stored under refrigeration and which could be simply and merely dispensed from a container directly onto a griddle is considered to be extremely desirable. In recent years, prepared waffle and pancake batter products have become available, but such products have usually been characterized by a very short shelf life. In certain instances, the shelf life of such products has been short because of the particular leavening acid employed. In other cases, it was found that the growth of bacteria and other microorganisms in the batter was not suitably arrested. Thus, even though such batters were adapted for refrigerated storage, nevertheless, because of a variety of factors, the batters were noted to deteriorate quite rapidly and, when baked after a reasonable period of storage, the baked products were judged to be inferior.

It is an object of the present invention to provide a flour mix composition which may be stored under ordinary conditions for extended periods of time without significant deterioration thereof. It is a further object of this invention to provide a batter adapted for refrigerated storage and prepared from said composition which may be stored for extended periods of time under typical refrigeration conditions and yet be capable of producing a satisfactory baked product after such period of storage. By the terms "batter adapted for refrigerated storage" or "refrigerated batter" as used herein, it is intended to cover batters which are stored and merchandised in a refrigerated but unfrozen condition. Generally, such products are maintained at temperatures between 35° F. and 45° F. and preferably at or about 40° F.

I have now discovered that the foregoing objects as well as certain other desirable objectives which will be elaborated upon more fully hereinafter may be realized and accomplished in a surprising and unexpected manner. Thus, in accordance with the present invention, it has been found that the use of certain purified ingredients in a flour mix composition affords good stability of said composition under ordinary storage conditions and permit a batter prepared therefrom to be stored at normal refrigeration temperature for extended periods of time without detectable or significant deterioration of said batter. Because of such finding it has been noted that under normal refrigeration, shelf life of 20 to 30 days may be expected for batters prepared from flour mix compositions comprising certain purified ingredients.

In flour mix compositions which contain ingredients as, for example, corn flour, rice flour, and dried egg yolks, it has been observed that the total plate count and coliform count of these several ingredients are at an extremely high level as contrasted with the counts of various other ingredients in such flour compositions. Such counts are indicative of the presence of microorganisms, principally bacteria. The data which is summarized in the following table points up such disparity:

TABLE I.—BACTERIAL EVALUATION OF RAW INGREDIENTS

| Lot No. | | Total Plate Count | 5-Day Total Plate Count | Coliform |
|---|---|---|---|---|
| 40-H | Bleached Wheat A Flour | <10 | 360 | <10 |
| 2004-A | ----do---- | 700 | | 0 |
| 40-I | Nonbleached Wheat D Flour | 500 | 16,000 | <10 |
| 2004-C | ----do---- | 0 | | 0 |
| 2004-G | Shortening | 1,000 | | 0 |
| 2004-L | Sodium Aluminum Phosphate | 0 | | 0 |
| 2004-K | Bicarbonate of Soda | 0 | | 0 |
| 2004-I | Salt | 0 | | 0 |
| 40-M | Albumen | <10 | 50 | <10 |
| 2004-M | ----do---- | 100 | | 0 |
| 40-J | Granulated Cane Sugar | <10 | <10 | <10 |
| 2004-E | ----do---- | 0 | | 0 |
| 40-K | Corn Sugar | <10 | <10 | <10 |
| 2004-H | ----do---- | 0 | | 0 |
| 2004-O | Dye Mixture (U.S. Cert. Color + Cane Sugar) | 6,000 | | 0 |
| 2004-N | Propyl Paraben | 100 | | 0 |
| 40-G | Corn Flour | 8,000 | 150,000 | 25,000 |
| 2004-B | ----do---- | 28,000 | | 120 |
| 2004-F | Rice Flour | 2,000 | | 0 |
| 40-L | Dried Egg Yolk | 16,000 | 21,000 | 190 |
| 2004-J | ----do---- | 1,400 | | 0 |

As a consequence, when a batter is prepared from such a flour mix composition containing ingredients as recited in the table hereinabove and is then stored for an appreciable period of time, for example, for two to four weeks, under ordinary refrigeration temperatures, significant deterioration of the batter is observed. However, when these ingredients having a high total plate count and coliform count have been purified by treatment with an alkylene oxide, spoilage or flavor taint of the batter is avoided since the number of microorganisms which might otherwise be present therein has been reduced to a safe, low level.

The use of an alkylene oxide for the treatment of food materials such as flour, starches, food powders or dried foods of various kinds has previously been adequately described both in patent and scientific literature. In this connection U.S. Patent Re. 22,284 generally describes the benefits of alkylene oxide treatment of various food materials and food stuffs. The process generally involves placing the material to be treated in a hermetically sealed retort where it may be heated to above normal atmospheric temperature. The air is evacuated from the retort and it is replaced by a measured volume of ethylene oxide or propylene oxide. The purification of food ingredients using either 100% ethylene oxide or 100% propylene oxide conforms with the provisions of the Federal Food, Drug and Cosmetic Act of 1938, as amended in 1958. After treatment, the gas is withdrawn from the retort and replaced by fresh, clean air. The process is effective in exerting bacterial action which efficiently and economically controls vegetative cells and spores which may be present in the food stuff or material.

Thus, ingredients for use in flour mix compositions were examined for the presence of microorganisms, principally bacteria, before and after treatment with propylene oxide. The effect of such treatment is illustrated in the results as appear in the following table:

TABLE II.—PURIFICATION OF INGREDIENTS USING PROPYLENE OXIDE

| Sample No. | | Untreated | | Treated | |
|---|---|---|---|---|---|
| | | Total Plate Count | Coliform | Total Plate Count | Coliform |
| 1 | Corn Flour | 16,000 | 70 | 60 | <10 |
| 2 | | 7,000 | 100 | <10 | <10 |
| 3 | | 58,000 | 10 | 20 | <10 |
| 4 | | 57,000 | 60 | 50 | <10 |
| 5 | | 38,000 | 70 | 130 | <10 |
| 5 | | 39,000 | 120 | <10 | <10 |
| 6 | | 28,000 | 60 | 290 | <10 |
| 6 | | 23,000 | 50 | <10 | <10 |
| 6 | | 25,000 | 80 | <10 | <10 |
| 7 | | 5,000 | <10 | <10 | <10 |
| 1 | Rice Flour | 4,800 | 390 | 200 | <10 |
| 2 | | 10,000 | 670 | 30 | <10 |
| 4 | | 1,400 | 30 | <10 | <10 |
| 5 | | 2,900 | 280 | 30 | <10 |
| 6 | | 900 | <10 | 30 | <10 |
| 7 | | 51,000 | <10 | 10 | <10 |
| 1 | Dried Egg Yolk | 4,200 | <10 | 40 | <10 |
| 2 | | 14,000 | 30 | 90 | <10 |
| 3 | | 6,200 | <10 | 550 | <10 |
| 4 | | 9,100 | 10 | 130 | <10 |
| 5 | | 61,000 | 20 | 2,400 | 10 |
| 6 | | 73,000 | 300 | 950 | 10 |

All ingredients of the flour mix composition of this invention are food grade materials.

The composition comprises unbleached and bleached wheat flour, shortening containing emulsifiers and freshness preservers, leavening, dried egg white, salt, sugar, coloring, spoilage retardant and purified corn flour, purified rice flour and purified dried egg yolk.

The wheat flours are standard flours of the bleached and unbleached types customarily employed for biscuits, cakes and other baked goods and may contain about 10 to 13% protein. A mixture of hard wheat and soft wheat flours may be used.

The shortening is a typical shortening, which can vary in plasticity from very firm to liquid and can include animal or vegetable fats, saturated or unsaturated. Illustrative types include lard, chicken fat, hydrogenated soya bean, cottonseed, corn, or other vegetable oils, or a mixture of one or more of these oils with an animal fat in any preparation so as to give a shortening having the usual and desired characteristics and taste. The shortening may also desirably contain suitable emulsifiers, preferably, various glyceride esters, and, specifically, mono- and diglycerides prepared from glycerine or other polyhydric alcohol, partially or wholly esterified with hydroxycarboxylic acids and fatty acids; also higher fatty acid esters of sugar; and polyalkylene ethers of fatty esters of polyhydric alcohols. Lecithins or hydroxylated lecithins may also advantageously be incorporated into the shortening.

In preparing the flour mix composition of this invention which is adapted to being prepared as a batter to be stored under normal refrigeration conditions, the use of sodium aluminum phosphate as the principal or sole leavening acid is desirable. Because of its low temperature stability, sodium aluminum phosphate, anhydrous and hydrated, and mixtures thereof, is noted to be especially advantageous in the preparation of a refrigerated batter. Sodium aluminum phosphate may also be employed in combination with various calcium salts including, but not limited to, monocalcium phosphate, dicalcium phosphate, tricalcium phosphate, and the like. The leavening acid, i.e., sodium aluminum phosphate, mixtures of sodium aluminum phosphate, and combinations thereof with calcium salts, is usually present in excess of the amounts stoichiometrically required to react with the other leavening ingredient, an alkaline material, preferably, bicarbonate of soda.

Dried egg albumen is also a desirable component of the flour mix composition.

Conventional seasoning agents as, for example, salt; commonly used sugars such as sucrose, dextrose, maltose, fructose, levulose, lactose and brown and invert sugars and mixtures thereof; and the like are also included in the flour mix composition. Although not necessary, if desired, suitable food coloring may be also a component of the composition to improve the appearance of the batter prepared therefrom.

A spoilage retardant or inhibitor may also be desirably incorporated into the flour mix composition. Typically, any one of a large number of such materials including, but not restricted to, the methyl, ethyl, propyl and benzyl esters of p-hydroxy benzoic acid and alkali metal salts of benzoic acid and propionic acids as well as combinations and mixtures thereof may be utilized. The use of certain alkylene oxide purified ingredients permits lower levels of such spoilage retardants or inhibitors to be employed, thus offering an additional advantage.

As pointed out hereinbefore, the corn flour, rice flour, and dried egg yolk components of the flour mix composition are all purified by treatment thereby by an alkylene oxide, thereby serving to produce a flour mix composition which is remarkably less subject to degradation because of the extremely low level of microorganisms present therein after such treatment. Further, a batter prepared theerfrom is surprisingly less prone to deterioration even after extended periods of storage under normal refrigeration conditions. For example, bacteriological tests were conducted on typical flour mix compositions containing unpurified and propylene oxide purified corn flour, rice flour and dried egg yolk ingredients. In each test, a typical flour mix composition as follows was employed:

TABLE III

| Ingredients: | Composition Percent |
|---|---|
| Extra fine granulated cane sugar | 5.00 |
| Dried egg yolk | 1.45 |
| Unbleached "D" flour | 17.81 |
| Yellow corn flour | 14.70 |
| Rice flour | 4.48 |
| Corn sugar | 3.50 |
| Albumen | 0.47 |
| Salt | 2.17 |
| Propyl paraben | 0.10 |
| Bicarbonate of soda | 1.75 |
| Shortening [1] | 8.22 |
| Bleached "A" flour | 38.60 |
| Leavener [2] | 1.75 |
| | 100.00 |

[1] Dry Mix Shortening #175, Durkee: a plasticized shortening made from meat fats (90%) and vegetable oils (10%) with glyceryl-lacto esters of fatty acids, mono- and di-glycerides and lecithin added.
[2] "Levn-Lite" Leavener, Monsanto: Sodium aluminum phosphate plus calcium salts.

TABLE IV.—BACTERIOLOGICAL TESTS OF TYPICAL FLOUR MIX COMPOSITIONS

| Flour Mix Composition (as in Table III) Containing— | Batch No. | Total Plate Count | Coliform |
|---|---|---|---|
| Unpurified Corn Flour, Rice Flour and Dried Egg Yolk | 1,608 | 10,000 | 120 |
| Purified Corn Flour, Rice Flour and Dried Egg Yolk | 3,842 | 40 | <10 |
| Do | 3,843 | 50 | <10 |
| Do | 3,854 | 200 | <10 |
| Do | 3,845 | 110 | <10 |
| Do | 3,846 | 80 | <10 |
| Do | 3,847 | 80 | <10 |
| Do | 4,680 | 120 | <10 |
| Do | 4,681 | 150 | <10 |
| Do | 4,682 | 250 | 10+ |
| Do | 4,683 | 230 | <10 |
| Do | 6,136 | 110 | <10 |
| Do | 6,137 | 210 | <10 |
| Do | 6,140 | 240 | <10 |
| Do | 6,143 | 180 | <10 |
| Do | 6,147 | 320 | <10 |
| Do | 221 | 80 | <10 |
| Do | 2,225 | 110 | <10 |
| Do | 229 | 50 | <10 |
| Do | 1,050 | 50 | <10 |
| Do | 1,051 | 80 | <10 |
| Do | 1,060 | 50 | <10 |
| Do | 1,061 | 50 | <10 |

As is seen from an inspection of the test results in the foregoing table, the level of microorganisms, principally bacteria, in flour mix compositions containing propylene oxide, purified corn flour, rice flour and dried egg yolk is unusually low as compared with the level in a composition containing unspecified ingredients. Such low counts are deemed more than acceptable for a flour mix composition. Further, studies made upon flour mix compositions containing purified ingredients which were subjected to conventional warehouse storage conditions indicated that no substantial increase in the level of microorganisms was apparent.

Bacterial counts were also taken of flour mix compositions with ingredients, as in Table III, containing propylene oxide purified corn flour, rice flour and dried egg yolk; milk employed in the preparation of a fresh egg batter, and final batters. Counts were also made on batters freshly prepared from flour mix compositions, with ingredients as in Table III, containing unpurified corn flour, rice flour and dried egg yolk. The batters were prepared by placing 550 grams of skim milk in a bowl and adding thereto 500 grams of dry flour mix composition. The mixture was blended until smooth. Results of such microbiological studies are summarized in the following table:

TABLE V.—BACTERIAL COUNTS ON MIX, MILK AND ON THE CORRESPONDING BATTER PRODUCED

| Sample | Flour Mix Composition | | Pasteurized Skim Milk | | Batter | |
|---|---|---|---|---|---|---|
| | Total Plate Count | Coliform | Total Plate Count | Coliform | Total Plate Count | Coliform |
| A | 120 | <10 | 870 | <10 | 430 | <10 |
| B | 40 | <10 | 640 | <10 | 150 | <10 |
| C | 100 | <10 | 880 | <10 | 70 | <10 |
| D | 80 | <10 | 980 | <10 | 40 | <10 |
| E | 50 | <10 | 200 | <10 | 80 | <10 |
| 40F | | | | | 80,000 | 32,000 |
| 166A | | | | | 60,000 | 220 |

Thus, the marked advantages accruing from the use of propylene oxide purified ingredients in a flour mix composition is evident from a comparison of the total plate count and coliform of batters prepared from flour mix compositions containing purified corn flour, rice flour and dried egg yolk (Samples A, B, C, D and E) with those of batters prepared from similar compositions but containing unpurified corn flour, and dried egg yolk (Samples 40F and 166A).

Batters prepared from flour mix compositions, with ingredients as in Table III, containing purified corn flour, rice flour and dried egg yolk were also examined after storage at a temperature above normal refrigeration temperature. Even after extended incubation at such temperature the level of microorganisms present in such batter was still at an acceptable level. Results of these tests on stored batter appear in the following table:

TABLE VI.—BACTERIAL TEST ON STORED BATTER AT 45° F. INCUBATION

| | No. 2050-A | | No. 2078-B | |
|---|---|---|---|---|
| | Total Plate Count | Coliform | Total Plate Count | Coliform |
| Initial | 90 | <10 | 230 | <10 |
| 5 days | 500 | <10 | 220 | <10 |
| 10 days | 600 | <10 | 120 | <10 |
| 15 days | 2,200,000 | 10+ | 1,500 | 10+ |
| 20 days | 4,000,000 | <10 | 47,000 | <10 |

NOTE.—Milk considered tainted at 19,000,000 Total Plate Count. At 26 days, Salmonella=100, negative; Staph. aureus=100, negative.

In preparing a batter from the flour composition of this invention, a dairy is particularly well equipped to produce the same since it can process and distribute the batter in the same manner as milk or other perishable milk containing products. Thus, a dairy may mix the dry ready mix flour composition of this invention with water and/or milk, and preferably skim milk, and after a suitable period of time for agitation, pump the batter into filling equipment whereupon the batter is packaged in standard milk cartons which are then refrigerated in the usual manner and sold through regular trade channels of the dairy.

A typical preparation in a dairy a waffle and pancake batter would comprise:

(a) One hundred and ten pounds of fresh pasteurized skim milk 38° to 42° F. are pumped or poured into a vat equipped with a high speed agitator.

(b) One hundred pounds of the dry, ready mix flour composition of this invention are mixed slowly with the milk while agitating the mixture. High speed mixing is continued until the batter is smooth and free of lumps while agitation is continued.

(c) The batter is then pumped to filling equipment. The temperature during the mixing and filling operations is controlled to a temperature below 50 to 55° F. The filled containers of batter are then routed to refrigerated storage wherein temperatures of less than 40° F. are maintained.

(d) The handling and distribution of the containers of the batter are accomplished in the same manner as for the transportation and storage of fresh milk, i.e., under refrigeration.

The consumer or householder who purchases the refrigerated batter in an outlet such as a supermarket, dairy or the like, may thus make waffles and pancakes at home with minimum inconvenience and effort. For example, the batter is poured onto a greased griddle (preheated to 400° F.) and, as in the case of waffles and pancakes which are prepared in the home, is cooked in the normal manner. Baking times for the waffles and pancakes prepared from the batter are no longer than those customarily employed and acceptability of the thus prepared waffles and pancakes is considered excellent.

While the foregoing invention has been described in conjunction with various preferred embodiments, it is to be understood, of course, that it is not to be limited merely thereto but the invention is to be construed broadly and is to be restricted only by the following appended claims.

I claim:

1. A flour mix composition suitable for combination with an aqueous liquid to prepare a batter with a refrigerated shelf life of from 20 to 30 days, comprising: wheat flour, shortening, leavening, dried egg white, seasoning, spoilage retardant, and non-toxic alkylene oxide purified corn flour, rice flour, and dried egg yolk.

2. The composition of claim 1 in which said non-toxic alkylene oxide is propylene oxide.

3. The composition of claim 2 in which said leavening is sodium aluminum phosphate in combination with bicarbonate of soda.

4. A batter adapted for refrigerated storage for from 20 to 30 days and suitable for waffles and griddlecakes comprising the flour mix composition of claim 1 in combination with milk.

5. A batter adapted for refrigerated storage for from 20 to 30 days and suitable for waffles and griddlecakes comprising the flour mix combination of claim 2 in combination with milk.

6. A batter adapted for refrigerated storage for from 20 to 30 days and suitable for waffles and griddlecakes comprising the flour mix composition of claim 3 in combination with milk.

References Cited

UNITED STATES PATENTS

| | | | |
|---|---|---|---|
| 1,167,133 | 1/1916 | Tierney | 99—94 |
| 1,791,429 | 2/1931 | Roark et al. | |
| 2,107,697 | 2/1938 | Griffith et al. | 99—225 |
| 2,982,662 | 5/1961 | Cochran et al. | 99—192 |
| 3,021,220 | 2/1962 | Going et al. | 99—92 |
| 3,144,342 | 8/1964 | Collier et al. | 99—225 X |
| 3,161,524 | 12/1964 | Opie et al. | 99—24 |
| 3,222,189 | 12/1965 | Perrozzi | 99—94 X |
| 3,255,016 | 6/1966 | Parker | 99—94 |

RAYMOND N. JONES, *Primary Examiner.*